(12) United States Patent
Suzuki et al.

(10) Patent No.: US 6,814,521 B2
(45) Date of Patent: Nov. 9, 2004

(54) BALL JOINT

(75) Inventors: Akemitsu Suzuki, Aichi (JP); Tokuji Yokoyama, Aichi (JP); Yasuhiro Kondoh, Aichi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 10/329,922

(22) Filed: Dec. 27, 2002

(65) Prior Publication Data

US 2003/0156896 A1 Aug. 21, 2003

(30) Foreign Application Priority Data

Feb. 21, 2002 (JP) ...................................... 2002-044521

(51) Int. Cl.$^7$ .............................................. F16C 11/06
(52) U.S. Cl. ....................... 403/134; 277/635; 277/637
(58) Field of Search ....................... 403/134; 277/635, 277/637

(56) References Cited

U.S. PATENT DOCUMENTS 3,381,987 A * 5/1968 Husen ..................... 277/635 X
4,220,418 A * 9/1980 Kondo et al. ............. 403/134 X
6,357,956 B1 * 3/2002 Zebolsky et al. ........... 403/134

FOREIGN PATENT DOCUMENTS

JP          11-63245         3/1999

* cited by examiner

*Primary Examiner*—John R. Cottingham
*Assistant Examiner*—Ryan M. Flandro
(74) *Attorney, Agent, or Firm*—Arent Fox PLLC

(57) ABSTRACT

A ball joint includes a retaining ring fitted to a shank of a ball stud, and a boot having first and second annular beads fitted to the retaining ring and a ball socket. The first mounting bead is formed with an end face seal portion and an inner periphery seal portion, which are adapted to come into close contact with a cylindrical portion and a large flange of the retaining ring, respectively. In such a ball joint, a clearance is provided between the first mounting bead and the small flange for permitting the movement of the first mounting bead toward the small flange. Thus, even when the ball stud and the ball socket are swung relative to each other in a state in which the boot has been hardened due to the freezing of snow deposited to the boot and the like, the generation of an excessive stress in the mounting bead of the boot can be avoided.

6 Claims, 3 Drawing Sheets

TENSIL FORCE

BALL JOINT

BACKGROUND OF THE INVENTION

1. Field of the Invention

The present invention relates to a ball joint used at an oscillating portion of a suspension of an automobile, and particularly to an improvement in a ball joint comprising a ball stud, a ball socket for swingably retaining a ball-shaped head of the ball stud with a bearing interposed therebetween, a retaining ring having a cylindrical portion fitted to a shank of the ball stud and a pair of large and small flanges protruding from axially outer and inner ends of the cylindrical portion, and a boot having first and second annular beads fitted to the retaining ring and the ball socket, the first mounting bead being formed with an inner periphery seal portion and an end face seal portion which are adapted to come close contact with the cylindrical portion and the large flange of the retaining ring, respectively.

2. Description of the Related Art

Such a ball joint is already known, for example, as disclosed in Japanese Patent Application Laid-open No.11-63245.

In the conventional ball joint, the first mounting bead of the boot is clamped by a pair of large and small flanges of the retaining ring, whereby the axial movement thereof is restrained, so that the first mounting bead is prevented from being separated from the retaining ring.

In the conventional ball joint, however, if the ball stud is swung relative to the ball socket in a state in which the boot has been hardened due to the freezing of mud or snow deposited to the boot and the like, the first mounting bead is pushed strongly against the small flange of the retaining ring in a side where a tensile force is applied to the boot. For this reason, there is a possibility that an excessive stress is generated in the first mounting bead, resulting in a deteriorated durability of the first mounting bead.

SUMMARY OF THE INVENTION

Accordingly, it is an object of the present invention to provide a ball joint, wherein even when the ball stud and the ball socket are swung relative to each other in the state in which the boot has been hardened due to the freezing of mud or snow deposited to the boot and the like, the generation of an excessive stress in the first mounting bead can be avoided to ensure the durability of the first mounting bead.

To achieve the above object, according to a first aspect and feature of the present invention, there is provided a ball joint comprising a ball stud, a ball socket for swingably retaining a ball-shaped head of the ball stud with a bearing interposed therebetween, a retaining ring having a cylindrical portion fitted to a shank of the ball stud and a pair of large and small flanges protruding from axially outer and inner ends of the cylindrical portion, and a boot having first and second annular beads fitted to the retaining ring and the ball socket, the first annular bead being formed with an inner periphery seal portion and an end face seal portion which are adapted to come into close contact with the cylindrical portion and the large flange of the retaining ring, respectively, wherein a clearance is provided between the first annular bead and the small flange for permitting the movement of the first annular bead toward the small flange.

The end face seal portion and the inner periphery seal portion correspond to an end face seal lip 26 and an inner periphery seal lip 27, respectively, in an embodiment of the present invention which will be described hereinafter.

With the first feature, when the boot is in a state in which it has been hardened due to the freezing of mud or snow deposited to an outer peripheral surface of the boot, even if the ball stud and the ball socket are swung relative to each other, the first annular bead is pulled toward the ball-shaped head and moved toward the small flange while sliding within the cylindrical portion of the retaining ring, in a side where the tensile force of the boot is applied. Thus, it is possible to avoid the generation of an excessive stress in the boot to ensure the durability of the boot.

If the movement of the first annular bead toward the small flange were excessive, the separation of the first annular bead from the retaining ring can be inhibited by abutment of the inner end face of the first annular bead against the small flange.

According to a second aspect and feature of the present invention, in addition to the first feature, both of the small flange of the retaining ring and the inner end face of the first annular bead opposed to the small flange are formed into tapered shapes such that they are inclined toward the ball-shaped head in a radially outward direction.

With the second feature, when the first annular bead is moved excessively toward the small flange, whereby the inner end face thereof is put into abutment against the small flange, an abutment shock can be dispersed radially outwards by the mutually abutting tapered faces of the inner end face and the small flange, whereby the damage to the first annular bead due to the abutment shock can be prevented. The formation of the inner end face and the small flange into the tapered shapes as described above ensures that a predetermined clearance can be provided between the inner end face and the small flange without setting the axial dimension of the cylindrical portion of the retaining ring at a specially large value, thereby avoiding an increase in size of the ball joint.

The above and other objects, features and advantages of the invention will become apparent from the following description of the preferred embodiment taken in conjunction with the accompanying drawings.

DESCRIPTION OF THE PREFERRED EMBODIMENT

A preferred embodiment of the present invention will now be described with reference to the accompanying drawings.

Figure 1A:
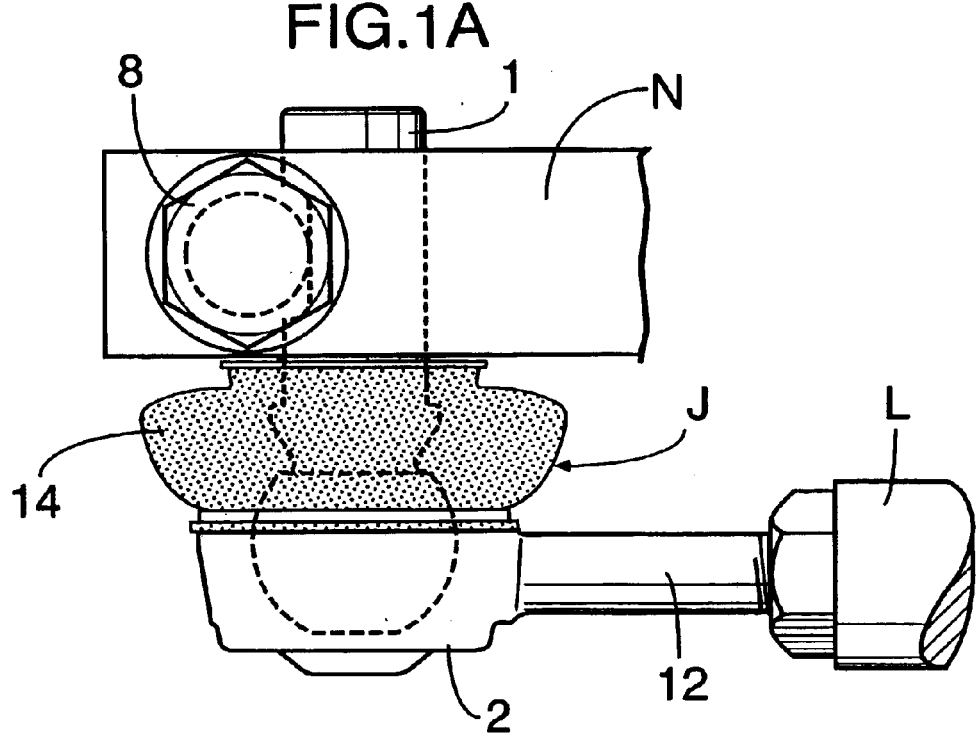
FIGS. 1A and 1B are side views of a section of a suspension of an automobile, which is provided with a ball joint of the present invention.
Figure 1B:
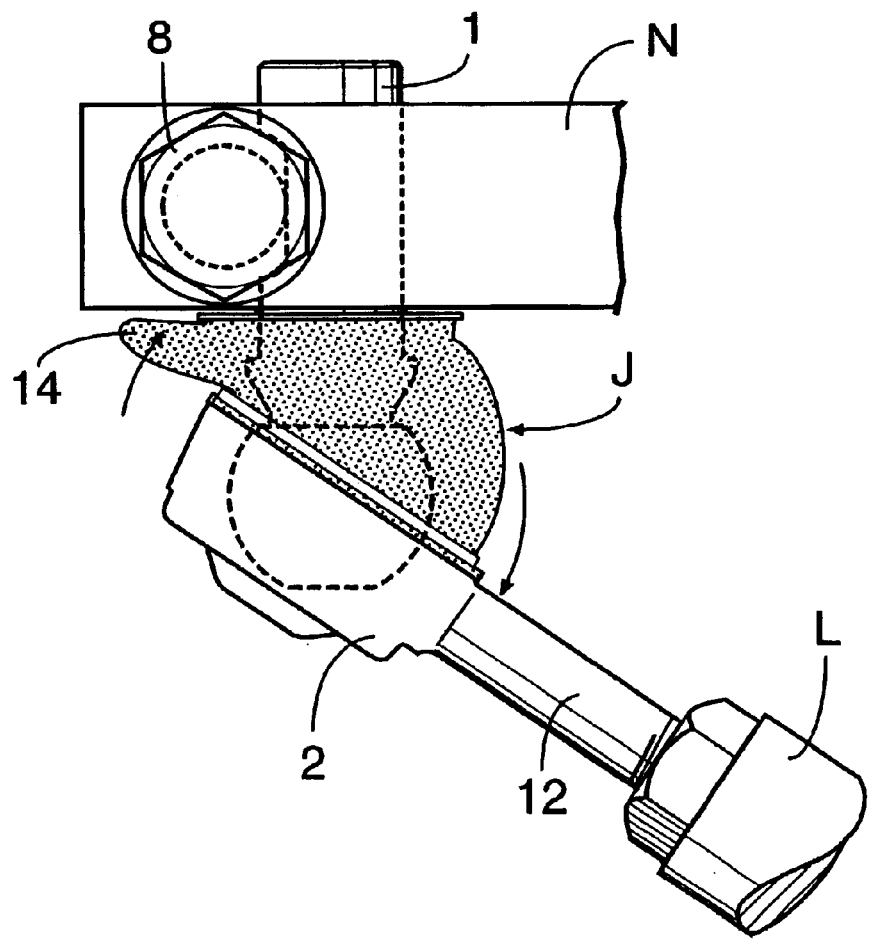

Referring first to FIGS. 1A and 1B, a link L and a knuckle arm N in a suspension of an automobile are connected to each other through a ball joint J according to this embodiment, so that they can be swung relative to each other in response to a vertical movement or turning of a wheel, as shown in FIGS. 1A and 1B.

Figure 2:
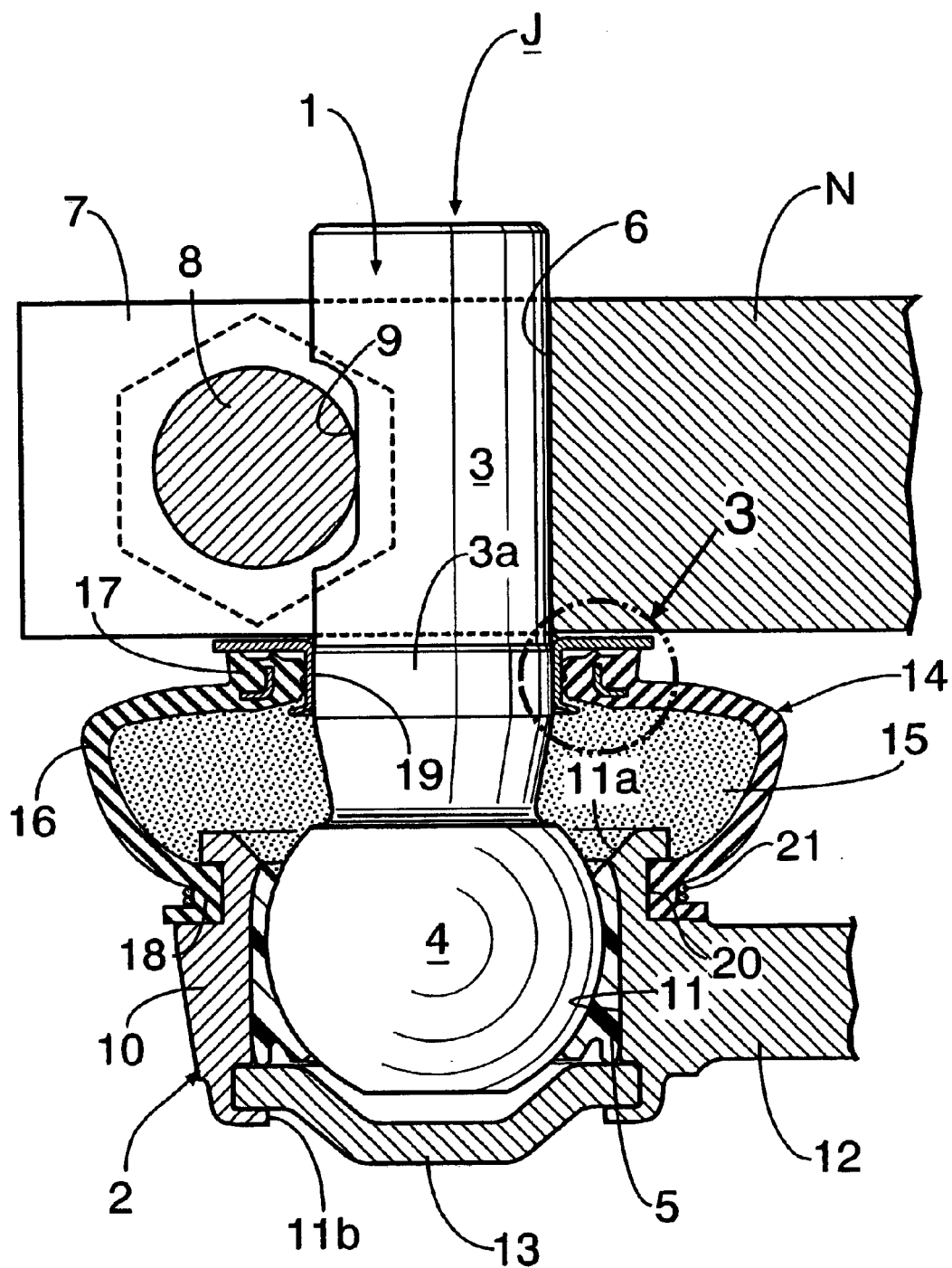
FIG. 2 is a vertical sectional view of the ball joint shown in FIG. 1.
Figure 3:
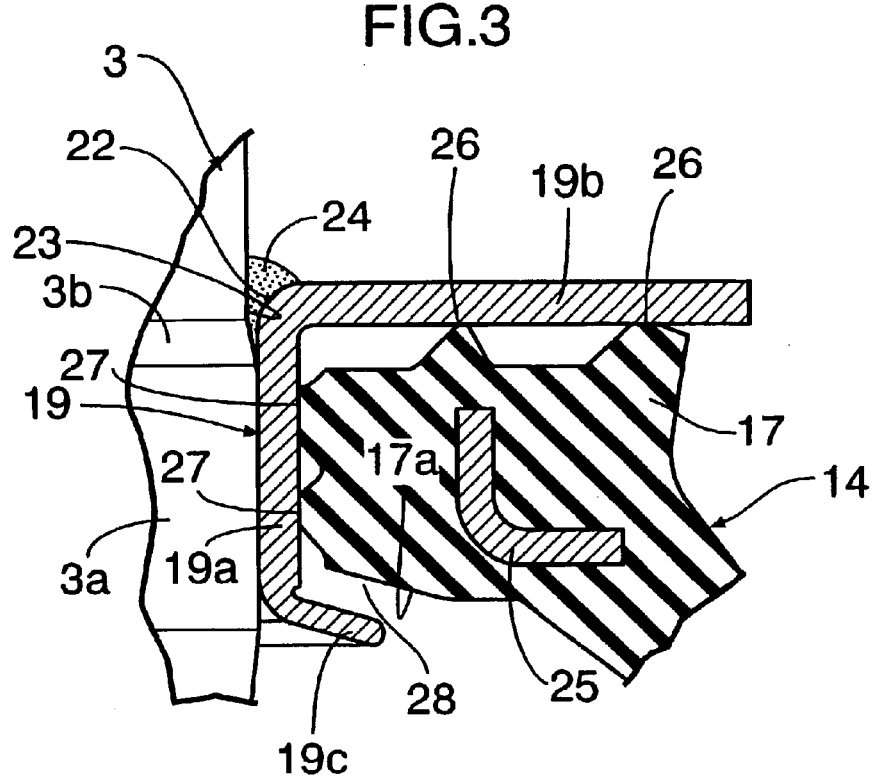
FIG. 3 is an enlarged view of a portion indicated by 3 in FIG. 2.

As shown in FIGS. 2 and 3, the ball joint J includes a ball stud 1 having a ball-shaped head 4 integrally formed at one end of a shank 3, and a ball socket 2 for retaining the ball-shaped head 4 with a bearing ring 5 interposed therebetween. Then ball stud 1 is fitted in a connecting bore 6 having a slit 7 in the knuckle arm N, and is connected to the knuckle N by tightening the slit 7 by a bolt 8. In this case, one side of the bolt 8 serves as a detent portion for the shank 3 by engagement in a notch 9 defined in one side of the shank 3.

The ball socket 2 comprises a socket body 10 formed with a housing 11 which accommodates the ball-shaped head 4 along with the bearing 5, a connecting arm 12 protruding from one side of the socket body 10, and a cap 13 for closing an opening 11b in the housing 11 opposite from an opening 11a from which the shank 3 of the ball socket 2 protrudes. The connecting arm 12 is connected to the link L.

A boot 14 is spread between the shank 3 and the socket body 10 to seal the opening 11a in the housing 11, and an appropriate amount of grease 15 for lubricating the periphery of the ball-shaped head is filled within the boot 14.

The boot 14 is made of an elastic material such as rubber and comprises a pouch-shaped boot body 16, and first and second annular mounting beads 17 and 18 integrally formed at opposite ends of the boot body 16. The second mounting bead 18 has a diameter larger than that of the first mounting bead 17. The first mounting bead 17 is mounted to a retaining ring 19 press-fitted and coupled to a shank 3 of the ball stud 1, and the second mounting bead 18 is mounted, as usual in the prior art, in an annular groove 20 defined in an outer periphery of a side end of the opening 11a in the socket body 10, and is tightened by a set ring 21.

The retaining ring 19 is made of a steel plate and comprises a cylindrical portion 19a, and a pair of large and small flanges 19b and 19c protruding radially from axially opposite ends of the cylindrical portion 19a, respectively. The cylindrical portion 19a is press-fitted and coupled to a press-fit portion 3a of the shank 3 of the ball stud 1, the press-fit portion 3a being exposed from the knuckle arm N toward the ball-shaped head 4 and having a diameter slightly larger than that of another portion, while the large flange 19b is opposed to a side of the knuckle arm N. In this case, a small annular recess 23 is defined between the large flange 19b and the shank 3.

More specifically, the small annular recess 23 is defined between an outer peripheral surface of the shank 3 and a small curved face 22 formed outside a folded portion between the cylindrical portion 19a and the large flange 19b, when the retaining ring 19 is formed by pressing. The small annular recess 23 is also defined between an inner peripheral surface of the large flange 19b and the outer peripheral surface of the shank 3 by bringing an annular step 3b between the press-fit portion 3a of the shank 3 and a smaller-diameter portion provided above the press-fit portion 3a from the large flange 19b toward the cylindrical portion 19a.

A liquid sealing agent 24 is applied to the small annular recess 23. Thus, the sealing agent 24 fills the small annular recess 23 and permeates into a very small clearance left between press-fit faces of the shank 3 and the cylindrical portion 19a by capillary action, and is then solidified.

On the other hand, an annular reinforcing ring 25 is embedded within the first mounting bead 17, as shown in FIG. 3. A pair of large and small end face seal lips 26, 26 arranged concentrically are formed on an axially outer end face of the first mounting bead 17, and a pair of inner periphery seal lips 27, 27 arranged axially are formed on an inner peripheral surface of the first mounting bead 17. The first mounting bead 17 is mounted to the retaining ring 19 in such a manner that the end face seal lips 26, 26 are in close contact with an inner side face of the large flange 19b and the inner periphery seal lips 27, 27 are in close contact with an outer peripheral surface of the cylindrical portion 19a. The close contact force of the end face seal lips 26, 26 with the large flange 19b relies on an axial stretching force of the boot body 16, and the close contact force of the inner periphery seal lips 27, 27 with the cylindrical portion 19a relies on a radial interference provided to the first mounting bead 17.

A predetermined clearance 28 is provided between the small flange 19c and the inner end face 17a of the first mounting bead 17 opposed to the small flange 19c, and adapted to permit the movement of the first mounting bead 17 toward the small flange 19c, when the end face seal lips 26, 26 are in close contact with the large flange 19b. In this case, both the small flange 19c and the inner end face 17a of the first mounting bead 17 opposed to the small flange 19c are formed into tapered shapes such that they are inclined toward the ball-shaped head 4 in a radially outward direction.

To form the small flange 19c of the retaining ring 19, in the embodiment, the first mounting bead 17 is first mounted to the cylindrical portion 19a, and an open end of a particular cylindrical portion 19a previously set at a tip end of the cylindrical portion 19a is then pressed from the side of the second mounting bead 18 by an expanding jig so that the open end is expanded. In this manner, the small flange 19c is formed.

The operation of this embodiment will be described below.

In the boot 14 of the ball joint J, the end face seal lips 26, 26 of the first mounting bead 17 are usually retained in close contact with the large flange 19b of the retaining ring 19 by the axial stretching force of the boot body 16 itself, and even when the ball stud 1 and the ball socket 2 are swung relative to each other, as shown in FIGS. 1A and 1B, the boot body 16 is only deformed resiliently, and the close contact of the end face seal lips 26, 26 of the first mounting bead 17 with the large flange 19b is retained. Therefore, it is possible to prevent the entrance of water, mud and sand into the boot 14 by a sealing function of the end face seal lips 26, 26 to the large flange 19b and a sealing function of the inner periphery seal lips 27, 27 to the cylindrical portion 19a.

The small annular recess 23 defined between the inner periphery of the large flange 19b of the retaining ring 19 and the shank 3 of the ball stud 1 is filled with the sealing agent 24 applied thereto, and a portion of the sealing agent also penetrates into the very small clearance left between the press-fit portions of the cylindrical portion 19a of the retaining ring 19 and the shank 3 of the ball stud 1 to fill the very small clearance. Therefore, it is possible to reliably prevent the entrance of water, mud and sand from the press-fit portions into the boot 14. Therefore, the very small clearance is permitted to remain between the press-fit portions of the shank 3 and the retaining ring 19 and hence, the reliability of the sealability of the press-fit portions can be enhanced, while enabling increases in acceptable ranges of the size and surface roughness of the press-fit portions and a press-fitting load, and moreover, an increase in cost due to the use of the sealing agent is extremely small.

The small annular recess 23 is defined between the outer peripheral surface of the shank 3 and the small curved face 22 formed outside the folded portion between the cylindrical portion 19a and the large flange 19b, when the retaining ring 19 is formed by pressing, and hence, it is unnecessary to conduct a special working or processing to the shank 3 and the retaining ring 19 for forming the small curved face 22, which can contribute to a reduction in cost.

The small annular recess 23 is defined between the inner peripheral surface of the large flange 19b and the outer peripheral surface of the shank 3 by bringing the annular step 3b between the press-fit portion 3a of the shank 3 and the smaller-diameter portion provided above the press-fit portion 3a from the large flange 19b toward the cylindrical portion 19a and hence, also in this case, it is unnecessary to conduct a special working or processing to the shank 3 and the retaining ring 19 for forming the small curved face 22, which can contribute to a reduction in cost.

If mud or snow deposited to the outer peripheral surface of the boot 14 is frozen during parking of the automobile in a cold district, the boot 14 is hardened. If the automobile is started in such a state and the ball stud 1 and the ball socket 2 are swung relative to each other with the starting of the automobile, the first mounting bead 17 is pulled toward the ball-shaped head 4 in a side where the tensile force of the boot is applied. However, because the clearance 28 is provided between the inner end face 17a of the first mounting bead 17 and the small flange 19c of the retaining ring 19, the first mounting bead 17 is moved toward the small flange 19c, while the inner periphery seal lips 27, 27 are slid on the cylindrical portion 19a of the retaining ring 19. Therefore, it is possible to avoid the generation of an excessive stress on the first mounting bead 17 and the boot body 16 to ensure the durability of the boot 14.

If the mud or snow in the frozen state is peeled off from the boot 14 by the slight flexure of the boot body 16 during such movement of the first mounting bead 17, the boot 14 exhibits an intrinsic stretching force to push back the first mounting bead 17 toward the large flange 19b, whereby the end face seal lips 26, 26 can be retained in close contact with large flange 19b.

Figure 4:
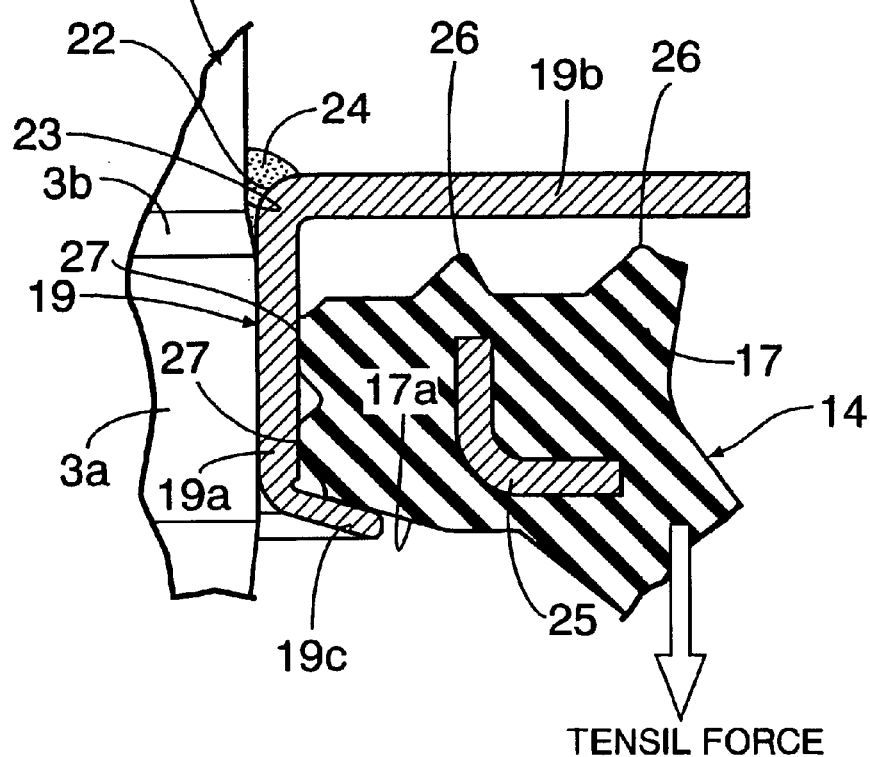
FIG. 4 is a view similar to FIG. 3 for explaining the operation.

If the movement of the first mounting bead 17 toward the small flange 19c were excessive, the separation of the first mounting bead 17 from the retaining ring 19 is inhibited by abutment of the inner end face 17a of the first mounting bead 17 against the small flange 19c, as shown in FIG. 4. In this case, because the inner end face 17a and the small flange 19c abutting against each other are of such tapered shapes that they are inclined toward the ball-shaped head 4 in the radially outward direction, as described above, a shock upon the abutment can be dispersed radially outwards, whereby the damage to the first mounting bead 17 due to the abutment shock can be prevented. The formation of the inner end face 17a and the small flange 19c into tapered shapes such that they are inclined toward the ball-shaped head 4 in the radially outward direction, ensures that the predetermined clearance 28 can be provided between the inner end face 17a and the small flange 19c, thereby avoiding an increase in size of the ball joint J.

Although the embodiments of the present invention have been described in detail, it will be understood that various modifications in design may be made without departing from the spirit and scope of the invention defined in the claims. For example, to seal the press-fit portions of the shank 3 of the ball stud 1 and the cylindrical portion 19a of the retaining ring 19, the entire periphery of the cylindrical portion 19a may be welded to the shank 3 by a laser beam, in place of the application of the sealing agent 24.

What is claimed is:

1. A ball joint comprising:
   a ball stud having a ball-shaped head;
   a ball socket that swingably retains said ball-shaped head of said ball stud with a bearing interposed therebetween;
   a retaining ring having a cylindrical portion fitted to a shank of said ball stud and a pair of large and small flanges protruding from axially outer and inner ends of said cylindrical portion; and
   a boot having first and second annular beads fitted to said retaining ring and said ball socket,
   wherein said first annular bead includes an inner periphery seal portion and an end face seal portion,
   wherein said inner periphery seal portion and said end face seal portion of said first annular bead contact said cylindrical portion and an inner surface of said large flange of said retaining ring, respectively,
   wherein a clearance is provided between said first annular bead and said small flange for permitting the movement of said first annular bead toward said small flange, and
   wherein both of said small flange of said retaining ring and the inner end face of said first annular bead opposed to said small flange are formed into tapered shapes such that they are inclined toward the ball-shaped head in a radially outward direction.

2. The ball joint according to claim 1, wherein said small flange extends obliquely relative to said cylindrical portion of said retaining ring.

3. The ball joint according to claim 1, further comprising an annular recess defined between said large flange of said retaining ring and said shank of said ball stud.

4. The ball joint according to claim 3, further comprising a liquid sealing agent which fills said annular recess.

5. The ball joint according to claim 1, further comprising an annular reinforcing ring embedded within said first annular bead.

6. The ball joint according to claim 1, wherein the inner end face of the first annular bead has an inner peripheral end connected to a lower end of the inner periphery seal portion, and the inner end face of the first annular bead is inclined from said inner peripheral end.

* * * * *